United States Patent [19]

Vance

[11] 4,322,851
[45] Mar. 30, 1982

[54] DECODING LOGIC FOR FREQUENCY SHIFT KEYING RECEIVER

[75] Inventor: Ian A. W. Vance, Newport, England

[73] Assignee: International Standard Electric Corporation, New York, N.Y.

[21] Appl. No.: 181,591

[22] Filed: Aug. 27, 1980

[30] Foreign Application Priority Data

Sep. 4, 1979 [GB] United Kingdom ............... 30578/79

[51] Int. Cl.³ ........................................... H04L 27/14
[52] U.S. Cl. ....................................... 375/88; 375/80; 329/104
[58] Field of Search ....................... 375/79, 83, 88, 80, 375/91, 42, 52, 54, 56; 328/134, 141; 329/110, 118

[56] References Cited

U.S. PATENT DOCUMENTS

| | | | |
|---|---|---|---|
| 3,760,412 | 9/1973 | Barnes | 329/104 |
| 3,944,939 | 3/1976 | Le Mouel | 329/104 |
| 4,090,145 | 5/1978 | Webb | 375/79 |
| 4,193,034 | 3/1980 | Vance | 375/88 |
| 4,240,035 | 12/1980 | Tauber | 375/94 |
| 4,246,653 | 1/1981 | Malm | 375/83 |

Primary Examiner—Benedict V. Safourek
Assistant Examiner—Stephen Chin
Attorney, Agent, or Firm—James B. Raden; Marvin M. Chaban

[57] ABSTRACT

A radio receiver employing paired signal paths with frequency shift keying. In each signal path pair in which demodulated signals in quadrature are produced, the outputs of the limiting amplifiers are connected to two pairs of flip-flops so that the phase changes in the amplifier outputs are indicated. The outputs of the flip-flops are selectively summed in two gates to drive the inputs of a further flip-flop the output of which is the decoded output signal.

4 Claims, 5 Drawing Figures

DECODING LOGIC FOR FREQUENCY SHIFT KEYING RECEIVER

This invention relates to a radio receiver for frequency shift keyed (FSK) signals on an RF carrier.

British Pat. No. 1,517,121 (I.A.W. Vance-3) and U.S. Pat. No. 4,254,503 disclose a radio receiver for FSK signals on an RF carrier comprising first and second signal paths to which the received radio signals are applied, each signal path including a mixed circuit followed by a low pass filter and a limiting amplifier stage, a local oscillator running at the carrier frequency, the local oscillator output being applied to one mixer circuit direct, means for applying the oscillator output to the other mixer circuit with a 90° phase shift, and a D-type clocked flip-flop to the D input of which is applied the output of one of the limiting amplifier stages whilst the output of the other limiting amplifier stage is applied to the clock input of the flip-flop.

In such a receiver with a simple decoding arrangement there is a constraint on the rate of which switching of the flip-flop in response to modulation of the received signal can occur. That is, there must be at least one positive edge on the clock line in each information bit period. The maximum bit rate is therefore equal to the FSK frequency deviation $\delta$ imposed on the carrier wave of frequency $f_c$. This constraint also holds true in the limiting amplifiers. Since these components preserve zero crossings whilst limiting amplitude information it is necessary for some zero crossings to occur when the signal is on each side of the local oscillator. When the bit rate exceeds the deviation frequency there will not be more than one transition on each side which, by Nyquist's criterion, conveys insufficient information. As the phase of the baseband signals on each side of the carrier is arbitrary there will be a variable delay in the changeover of the decoder output.

The present invention is concerned with improving the decoding arrangements to enable increased bit rates to be achieved.

According to the present invention there is provided a radio receiver for frequency shift keyed (FSK) signals on an RF carrier comprising n/2 pairs of signals paths to which the received radio signals are applied, where n is multiple of 2 which is greater than 2, a local oscillator running at the carrier frequency, means for mixing the local oscillator output with the received radio signals in each path whereby the mixed signals in each of the paths of a pair are in quadrature and the mixed signals in successive paths have effectively a phase shift of 360/n° with respect to adjacent paths, each path including a low pass filter and a limiting amplifier stage to which the mixed signals are applied, the output from the limiting amplifier in each path forming effectively a square wave signal, decoding logic circuit means for each pair of paths to which the outputs from the limiting amplifiers are applied whereby changes in the relative phase of the amplifier outputs are indicated and means for summing the outputs of the decoding means.

Embodiments of the invention will now be described with reference to the accompanying drawings, in which.

Figure 1:
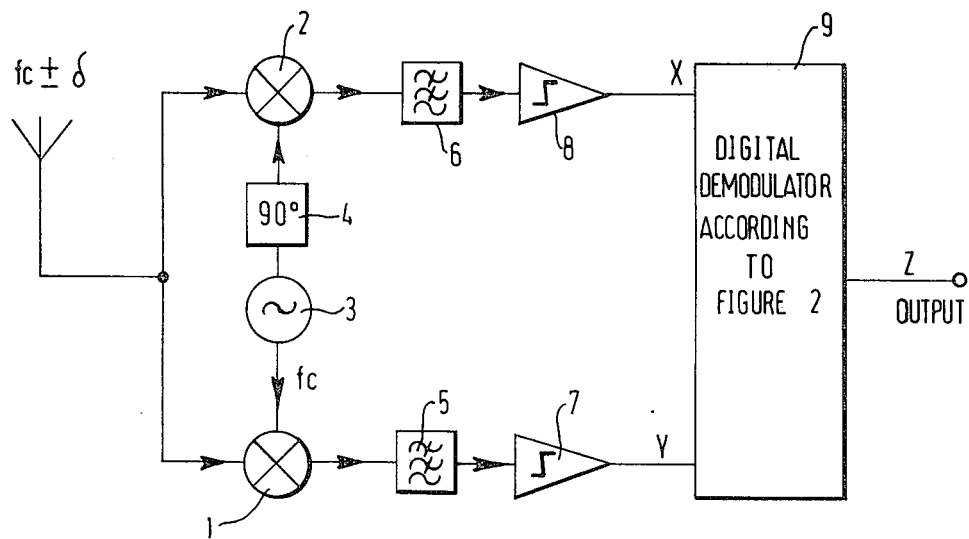
FIG. 1 is a block diagram of a basic radio receiver for FSK signals.

In the arrangement shown in FIG. 1 the received radio signals $f_c \pm \delta$, where $f_c$ is a carrier wave frequency and $\delta$ is the FSK modulation deviation, are fed to two mixer circuits 1, 2. A local oscillator 3 running at the frequency $f_c$ is fed directly to mixer circuit 1 and via a phase shift network 4, which introduces a 90° phase shift, to mixer circuit 2. The outputs of mixer circuits 1 & 2 are fed to low-pass filters 5 & 6 respectively. The filtered signals are then fed to high gain limiting amplifier stages 7, 8 respectively. The filtered and limited signals X, Y are square waves in quadrature and can be treated as fully symmetrically limited logic level outputs. These signals can then be applied to decoding logic 9 to recover baseband information.

Figure 2:
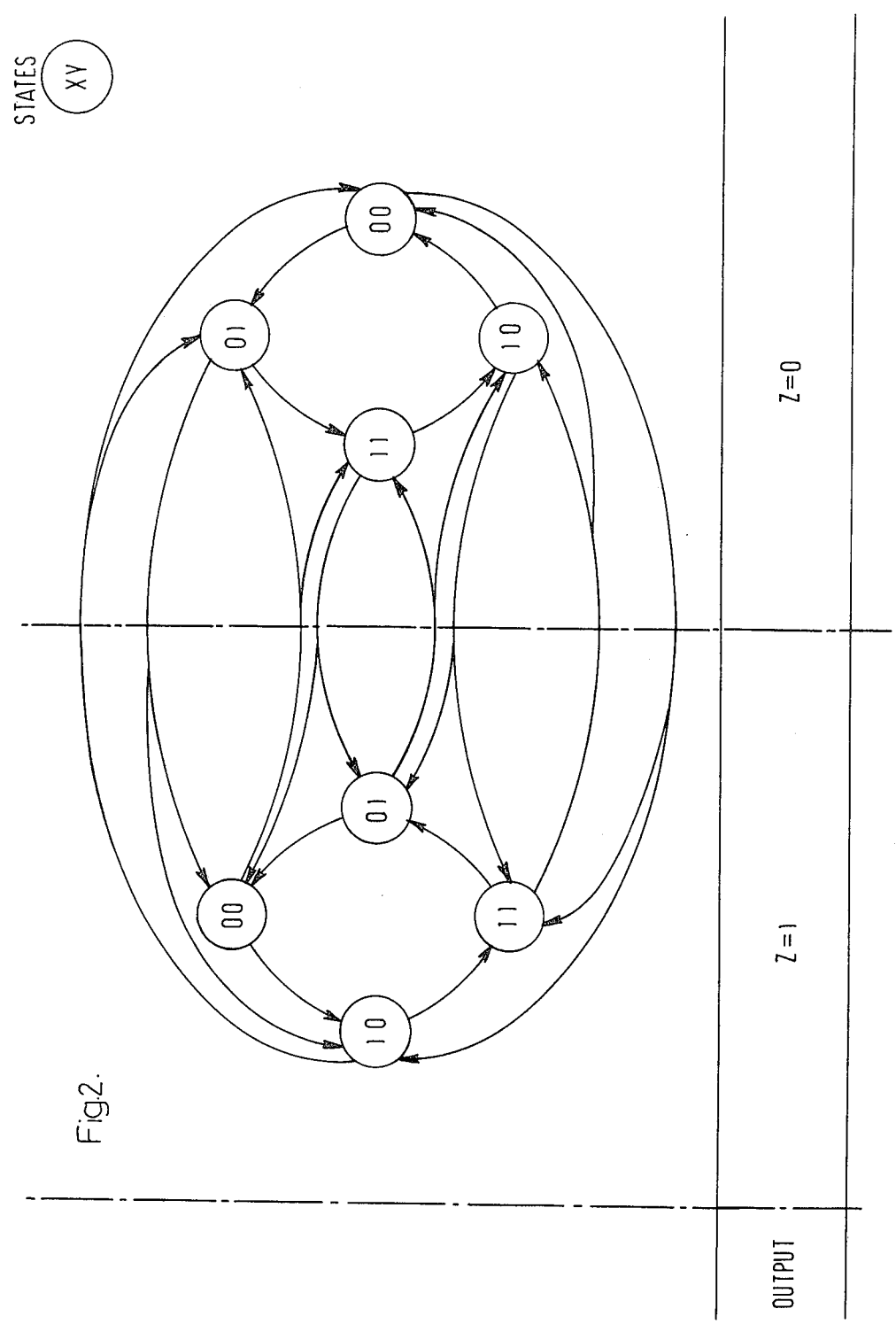
FIG. 2 is a logic state diagram for decoding the signals appearing at X, Y in FIG. 1.

The decoding logic is required to perform according to the logic state diagram shown in FIG. 2. The output Z depends on the sequence of states of the two inputs X and Y as shown. Thus assuming that an existing XY state is '0''0' and is characterised as output Z='1', then Z='0' occurs only if X and Y both go to '1' or Y alone goes to '1'. The only other change in inputs, i.e. X goes to '1' and Y remains at '0' does not change Z. Other sequences can readily be deduced from FIG. 2.

Figure 3:
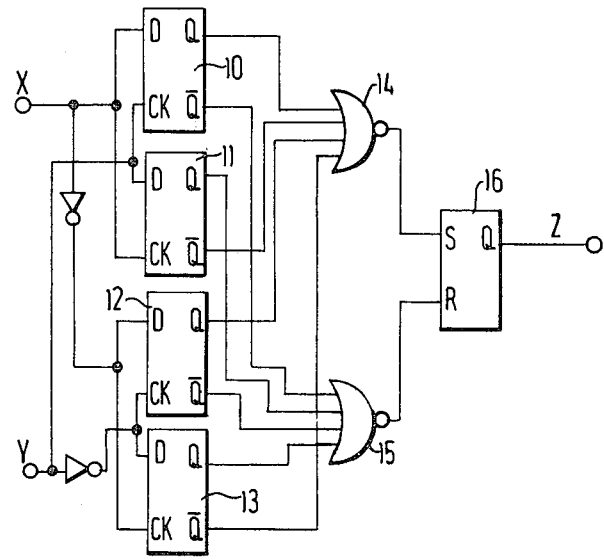
FIG. 3 shows a simple decoding logic arrangement for the receiver of FIG. 1.
Figure 4:
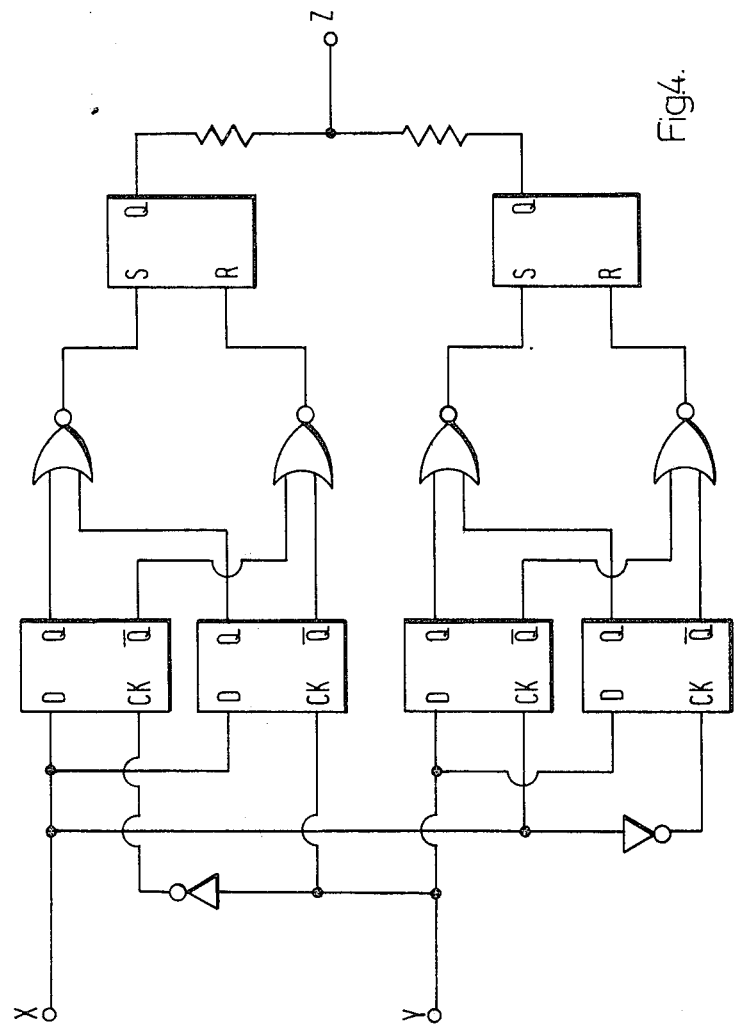
FIG. 4 shows an alternative decoding logic arrangement.
Figure 5:
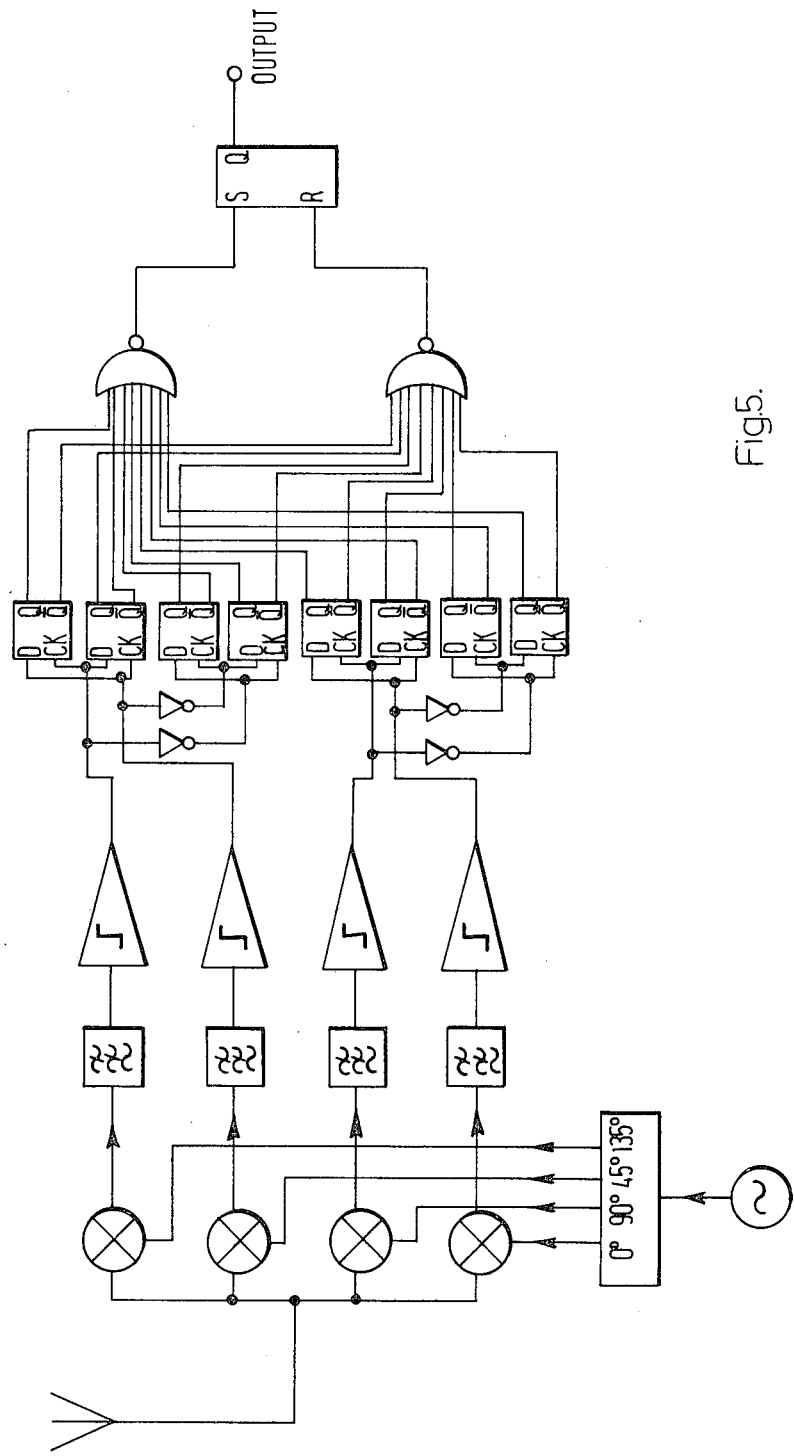
FIG. 5 shows an n path radio receiver for FSK signals.

The decoding logic of FIGS. 3, 4 and 5 uses what are herein referred to as D-type clocked flip-flops. A D-type clocked flip-flop is defined as a bistable circuit which will propagate whatever information is at its conditioning D (data) input prior to the occurrence of a clock pulse to the '1' (or Q) output on the leading edge of the clock pulse. The '0' (or $\bar{Q}$) output delivers at the same time the inverse of the information at the D input.

In the arrangement shown in FIG. 3 each of the signals X, Y is fed directly to the respective D input of one and clock input of the other of a first pair of D-type clocked flip-flops 10, 11, and with phase inversion to a respective D input of one and clock input of the other of a second pair of flip-flops 12, 13. The flip-flops are triggered on the rising edge of the clock input. The Q outputs of flip-flops 10 and 12 and the $\bar{Q}$ outputs of flip-flops 11 and 13 are fed to a first 4-input NOR gate 14, the remaining outputs are fed to a second NOR gate 15. The NOR gate outputs are fed to the SET and RESET inputs respectively of a so-called "Set/Reset" flip-flop 16. This is a bistable in which a '0' logic level delivered to the SET input causes the Q output to deliver a '1' and vice versa. It is triggered on the negative going edges of its two inputs. The Q output of flip-flop 16 is the FSK output Z of the receiver.

FIG. 4 shows yet another decoding arrangement in which the outputs of the four flip-flops are first decoded in pairs, the pairs being chosen as the flip-flops which are clocked from one input line and its inverted form. The outputs of the two digital decoding circuits are then added algebraically. This arrangement only operates at half the speed (or twice the output edge jitter) of that shown in FIG. 3 but has the advantage that noise inputs or errors occurring only on one input X or Y will produce only a half maximum amplitude spurious noise pulse at the output.

The speed of decoding in the receiver can be improved by increasing the number of signal paths, provided always that the number n of paths is a multiple of 2 with the mixed signals in each of the paths of a pair in quadrature and that the signals in each path have a phase shift of 360/n° with respect to the signals in the other paths. In a 4-path system, such as that shown in FIG. 5, there are twice as many edges (decisions) available at the outputs of the limiting amplifiers in any given period and this arrangement is therefore capable of decoding the data at twice the rate of the basic 2-path arrangement. The D-type flip-flop pairs are the same for each pair of paths as in the 2-path arrangement, the only difference being that for any number n of paths there are still only two NOR gates, each of which is now a 2n-input NOR gate.

The worst case distortion of one edge of a received pulse is then given by:

$$D_{max} = (\text{Bit rate})/2n \times \delta) \times 100\%$$

The distortion is distributed as follows:
 0.5 probability of no distortion.
 remaining 0.5 probability equally distributed up to $D_{max}$.

This is all delay and hence an averaging clock extraction circuit will time the bit edge at 0.25 $D_{max}$ late of the real transition, if the mark and space ('1' and '0') frequency deviations are equal.

I claim:

1. A radio receiver for frequency shift keyed signals on a RF carrier comprising n/2 pairs of signal paths to which the received radio signals are applied, where n is a multiple of 2 which is greater than 2, comprising a local oscillator running at the carrier frequency, means for mixing the output of the local oscillator with received radio signals in each path whereby the mixed signals in each of the paths of a pair are in quadrature and the mixed signals in successive paths have effectively a phase shift of 360/n° with respect to adjacent paths, each path including a low pass filter and a limiting amplifier stage to which the mixed signals are applied, the output from the limiting amplifier in each path forming effectively a square wave signal, decoding logic circuit means for each pair of paths to which the outputs from the limiting amplifiers are applied whereby changes in the relative phase of the amplifier outputs are indicated and binary adder means for summing the outputs of the decoding means, and in which said decoding logic circuit means includes for each pair of paths two pairs of D-type flip-flops, the output of the limiting amplifier in each path being applied to a D-input of one flip-flop and clock input of the other of one pair of flip-flops and with relative inversion to a D-input of one flip-flop and clock input of the other of the second pair of flip-flops.

2. A receiver according to claim 1 wherein said decoding logic circuit means includes said binary adder means comprise means for logically adding the '1' or Q output from the first flip-flop in each pair with the '0' or Q output from the second flip-flop in each pair, and bistable means for clocking the output of one adding means with the output of the other adding means.

3. A receiver according to claim 1 wherein said binary adder means includes means for logically adding the '1' or Q output of each flip-flop in a pair with the '0' or Q output of the other flip-flop in the pair, bistable means for clocking the output of each one of a pair of adding means with the output from the other one of the pair of adding means, and means for algebraically adding the outputs of the bistable means.

4. A receiver according to claim 2 or 3 wherein the bistable means comprises a reset-set flip-flop.

* * * * *